United States Patent [19]

Maier

[11] 4,428,023
[45] Jan. 24, 1984

[54] ELECTRONIC PROTECTIVE CIRCUIT

[75] Inventor: Franz Maier, Wettingen, Switzerland

[73] Assignee: BBC Brown, Boveri & Company Limited, Baden, Switzerland

[21] Appl. No.: 438,242

[22] Filed: Nov. 1, 1982

Related U.S. Application Data

[63] Continuation of Ser. No. 232,513, Feb. 9, 1981, abandoned.

[30] Foreign Application Priority Data

Feb. 25, 1980 [CH] Switzerland .................... 1464/80

[51] Int. Cl.³ ............................................. H02H 7/10
[52] U.S. Cl. ...................................... 361/100; 361/57;
363/138; 363/37; 363/50; 307/252 M
[58] Field of Search ................ 361/21100, 56, 54, 57;
363/138, 135, 136, 128, 37, 34, 50, 54, 57, 58;
307/252 M

[56] References Cited

U.S. PATENT DOCUMENTS

| | | | |
|---|---|---|---|
| 3,098,949 | 7/1963 | Goldberg | 361/100 |
| 3,354,326 | 11/1967 | Grees et al. | 307/252 M |
| 3,702,962 | 11/1972 | Wohr et al. | 361/100 X |
| 3,794,885 | 2/1974 | Kishi et al. | 361/100 |
| 4,056,766 | 11/1977 | Zander | 363/138 X |
| 4,135,236 | 1/1979 | Mann et al. | 307/252 M X |
| 4,146,921 | 3/1979 | Akamatsu | 363/138 |

FOREIGN PATENT DOCUMENTS 1638592 6/1971 Fed. Rep. of Germany .

Primary Examiner—Patrick R. Salce
Attorney, Agent, or Firm—Werner W. Kleeman

[57] ABSTRACT

The rectifiers for generating direct-currents or hybrid or complex currents for inductive loads must be protected against fault currents which can arise due to faulty operating conditions in the load inductance, by providing for a rapid current cutoff. The heretofore known electronic protective circuits are not suitable for this purpose because the excitation circuit connected in parallel with the load only contains one diode which, in the case of complex currents with large control angle and the thus caused negative voltage peaks, conducts the current during the duration of such voltage peaks, so that the deexcitation circuit periodically only acts as a shunt circuit for the load. To avoid this drawback the new and improved protective circuit contains a controlled valve in the deenergization or deexcitation circuit. According to a preferred embodiment of the protective circuit the extinguishing circuit is connected in parallel to the rectifier bridge and the extinguishing and deenergization circuit possess a common current path making it possible to use a common controlled valve for the extinguishing and the deenergization circuit.

5 Claims, 5 Drawing Figures

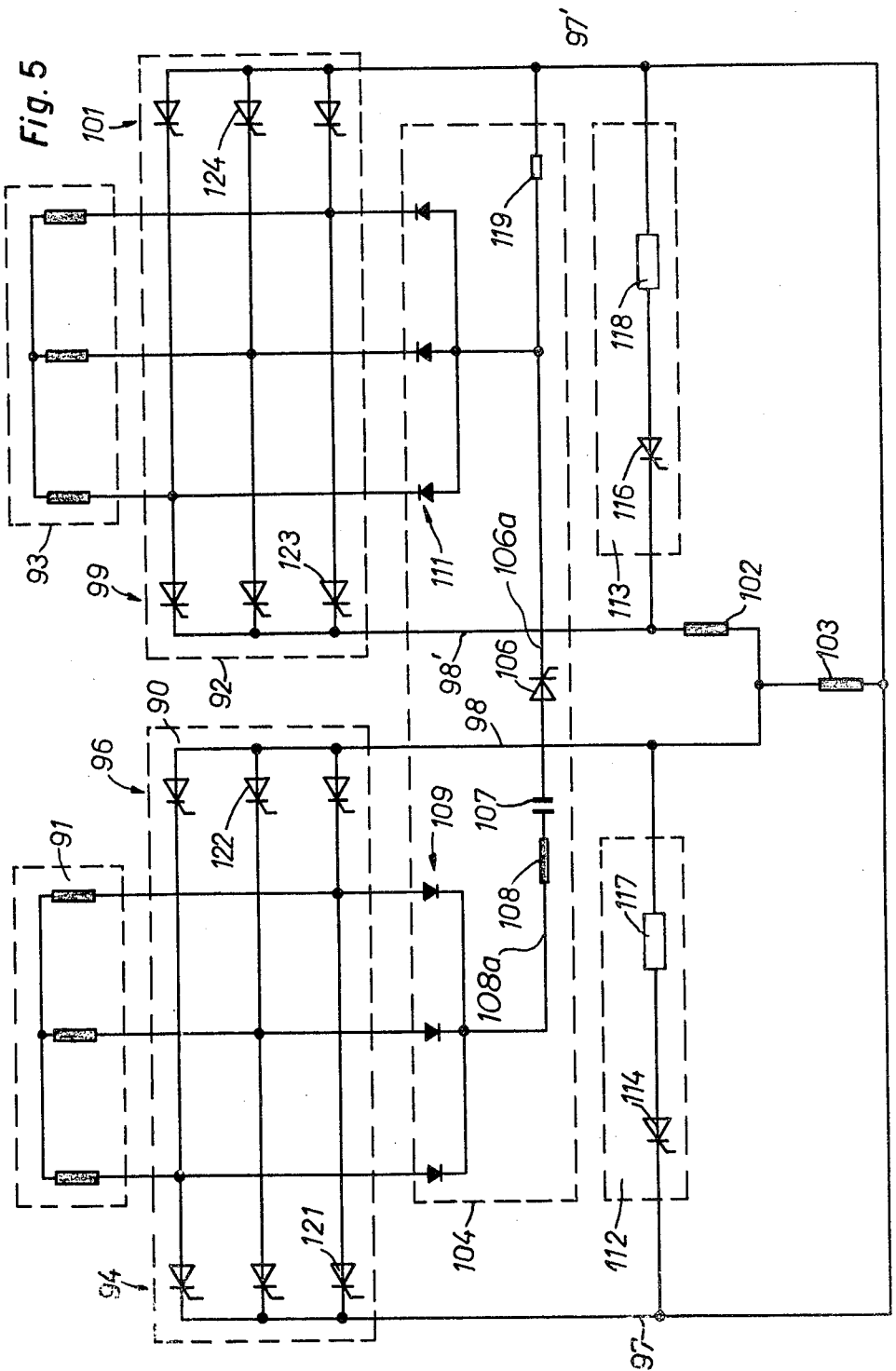

ELECTRONIC PROTECTIVE CIRCUIT

This is a continuation of application Ser. No. 232,513, filed Feb. 9, 1981.

BACKGROUND OF THE INVENTION

The present invention relates to a new and improved construction of an electronic protective circuit.

Generally speaking, the electronic protective circuit of the invention serves for interrupting the current flowing from a bridge rectifier or a centre point circuit to an inductive load and for deenergizing the inductive load. This protective circuit contains an extinguishing circuit which is connected in parallel with at least one switching thyristor and an extinguishing thyristor and a capacitor connected in series therewith. Further, there is provided a deenergization circuit connected in parallel with the load and containing at least one deenergization resistance.

An electronic protective circuit, contemplated for use with direct-currents, of the aforementioned type is already known and has been illustrated and described, for instance, by K. Heumann in the publication Wiss. Ber. AEGTELEFUNKEN, Volume 48 (1975), page 115. This protective circuit contains a diode connected parallel to the load and polarized towards the load current. The diode forms a deenergization circuit which after cutoff of the load current shunts the inductive load and carries the deenergization current. If this protective circuit is used for mixed or complex currents of a controlled rectifier, which with large control angle has its voltage experiencing a brief reversal of the polarization, then during this time span the diode is switched into its conductive state and forms a shunt with respect to the load through which there can flow part of the load current.

In order to avoid such current shunt there have been used for large electrical machines, whose field winding is connected with a multi-phase rectifier, preferably protective switches with explosive triggering. The construction and mode of operation of such protective switches are well known to those skilled in the art and, for instance, have been illustrated and disclosed by Brückner and Schmitz in Kalor-Emag-Mitteilungen 1956, Volume 4, pages 2 et seq. Although this type of switch functions satisfactorily it still is afflicted with a number of appreciable drawbacks. The switch is destroyed each time that there is undertaken the explosive triggering and thus must be replaced, it requires a massive, relative large housing which entraps parts which are propelled away during the explosion operation, and it cannot be installed in moved machine parts.

SUMMARY OF THE INVENTION

Therefore, with the foregoing in mind it is a primary object of the present invention to provide a new and improved construction of an electonic protective circuit which is not associated with the aforementioned drawbacks and limitations of the prior proposals.

Another and more specific objects of the present invention aims at providing a new and improved construction of an electronic protective circuit which only contains electronic components, the deenergization circuit of which also does not carry any load current even with increased phase control, is capable of accomplishing a practically random multiplicity of switching operations and, if desired, also can be mounted in rapidly moving machine parts.

Now in order to implement these and still further objects of the invention, which will become more readily apparent as the description proceeds, the electronic protective circuit of the invention is manifested by the features that its deenergization or deexcitation circuit contains a controlled valve.

The novel protective circuit can be constructed with purely electronic components and prevents part of the load current from flowing through the deexcitation circuit, even if the voltage generating the load current contains periodically appearing peaks or spikes with reversed sign. The novel circuit requires very little place and also can be installed in machine parts which are exposed to pronounced mechanical forces, vibrations or accelerations.

According to a first preferred embodiment of the novel protective circuit the deexcitation circuit and the extinguishing circuit contain a common current path, and the extinguishing thyristor is simultaneously used as the controlled valve for the deexcitation circuit, whereas the remaining part of the deexcitation circuit contains a diode which is poled in series with the extinguishing thyristor.

According to another preferred embodiment the extinguishing circuit is connected by means of decoupling diodes with the supply voltage lines for the bridge rectifier which contains thyristors, and at least the one bridge rectifier thyristor poled parallel to the extinguishing thyristor is used as a switching thyristor.

According to another embodiment the extinguishing circuit is connected parallel to both branches of the bridge rectifier equipped with thyristors. This embodiment renders possible designing the part of the extinguishing circuit composed of the extinguishing thyristor and the capacitor so as to have low inductance and to use the secondary winding of the transformer connected forwardly of the rectifier bridge as the extinguishing circuit inductance. Additionally, it affords the advantage that the conductive thyristor or thyristors in both bridge branches are practically simultaneously extinguished.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 5 illustrates a principle circuit diagram of a circuit-current containing anti-parallel circuit wherein the current flowing through the controlled valves in the rectifier portion and in the inverter portion can be interrupted with only one extinguishing circuit.

DETAILED DESCRIPTION OF THE PREFERRED EMBODIMENTS

Figure 1:
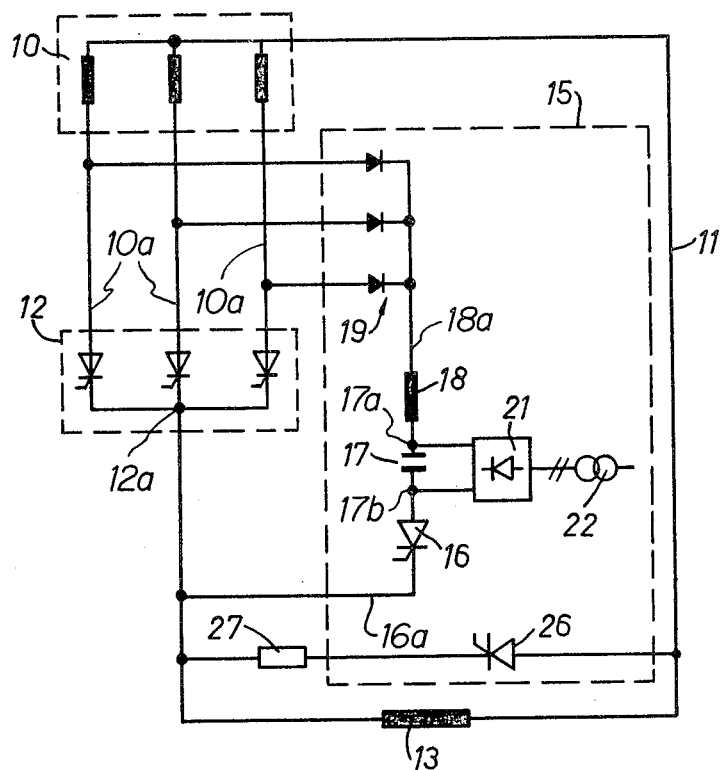
FIG. 1 illustrates a principle circuit diagram of an electronic protective circuit whose extinguishing circuit is separate from the deenergization or deexcitation circuit.

Describing now the drawings, the thyristors shown in the various figures thereof have been connected with operatively associated electronic control circuits. The construction and the function of such control circuits as well as their coaction with the thyristors is well known to those skilled in the electronics art, and therefore the same has not been here particularly illustrated in the drawings nor described in the corresponding portion of the disclosure, especially since such conventional structure and operation is not crucial for understanding the underlying principles and concepts of the invention itself.

Belonging to the extinguishing circuit of the novel protective circuit is, of necessity, a charging circuit for the extinguishing capacitor. This charging circuit has been schematically shown in FIG. 1, and in the further FIGS. 2 to 5 the same has been conveniently omitted in order to simplify the illustration.

FIG. 1 schematically shows a three-phase centre point circuit for powering the field winding of an electrical machine having a related protective circuit.

The three-phase centre-point or centre-tap circuit has associated therewith the three-phase secondary winding 10 of a transformer, whose one common output is connected by means of a line 11 and whose other three outputs are connected by means of a rectifier arrangement 12, containing three not particularly referenced thyristors, with the field winding 13 of the machine. The protective circuit 15 contains an extinguishing thyristor 16 which is connected in series with an extinguishing capacitor 17 and an extinguishing choke 18. The free connection or terminal 16a of the extinguishing thyristor 16 is connected with the output 12a of the rectifier 12 and the free connection or terminal 18a of the extinguishing choke 18 is connected by means of three parallel connected decoupling diodes 19 with the infeed lines 10a leading to the rectifier arrangement 12. Both of the connections or terminals 17a and 17b of the extinguishing capacitor 17 additionally are connected with a charging rectifier 21 which is connected with a supply transformer 22. Belonging also to the protective circuit 15 is a thyristor 26 which is connected in series with a deexcitation or deenergization resistance 27. This series circuit forms a controllable parallel circuit with respect to the field winding 13.

As far as the description of the function of the novel protective circuit of the invention is concerned it is here assumed that the potential at the extinguishing capacitor 17 is greater than the potential at the rectifier or rectifier means 12 and the polarity of the potential at the extinguishing capacitor 17 corresponds to the polarity of the parallel connected rectifier. During the undisturbed operation of the machine the thyristors of the rectifier 12 are sequentially and periodically fired by a not particularly illustrated control circuit in conventional manner, in order to supply the field winding 13 with the contemplated excitation current. The extinguishing thyristor 16 and the deenergization or deexcitation thyristor 26 are blocked during this period of time.

As soon as there arises a malfunction or disturbance in the field circuit, for instance an impermissibly high field current, induced by a fault or short-circuit in the armature circuit, then the thyristor control circuit receives a cutoff signal from a not particularly illustrated sensor circuit. The cutoff signal causes the extinguishing thyristor 16 and the deexcitation thyristor 26 to receive a firing or ignition pulse and at the same time the gating signals for the thyristors in the rectifier arrangement or rectifier 12 are blocked. The discharge current of the extinguishing capacitor 17 which is effective upon firing of the extinguishing thyristor 16 flows through the field winding 13, the secondary winding 10 of the transformer, the decoupling diodes 19 and the extinguishing choke or reactive coil 18, until the capacitor 17 again reverses its charge or discharges, as the case may be. Consequently, the discharge current replaces for a short period of time the current delivered by the rectifier arrangement or rectifier 12, so that the thyristor or the thyristors in the rectifier 12 which have been connected-in during this time are without current. With suitable dimensioning of the extinguishing capacitor 17 and the extinguishing choke 18 this time span is longer than the recovery time of the thyristors in the rectifier arrangement 12, so that the current flow is interrupted by the thyristors. After reversing the polarity of the capacitor 17 the current commutates to the deexcitation circuit formed by the thyristor 26 and the resistance 27.

It should be understood that the protective circuit only is effective when the voltage at the extinguishing capacitor 17 and the direction of conductivity of the extinguishing thyristor 16 are chosen such that the discharge current briefly replaces the primary current or can interrupt the same. On the other hand, it is possible to randomly interchange the sequence of the extinguishing thyristor 16, extinguishing capacitor 17 and extinguishing choke 18 in the illustrated series circuit, without thereby impairing the function of the protective circuit.

Figure 2:
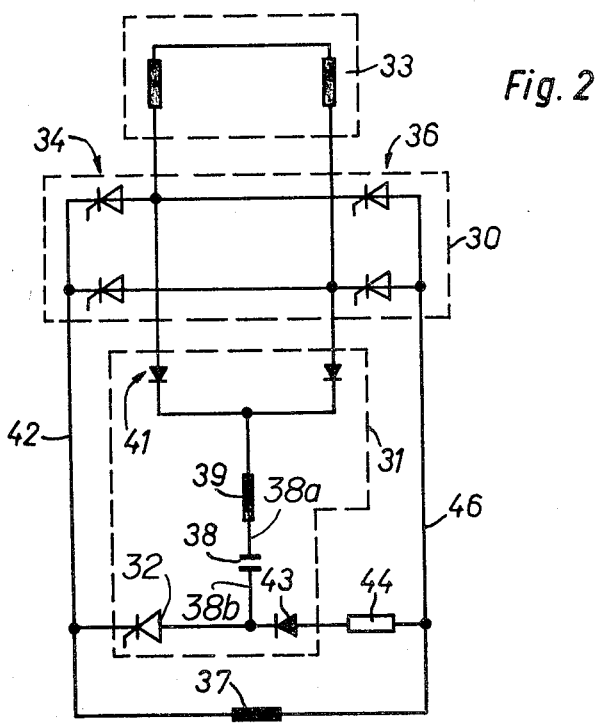
FIG. 2 is a principle circuit diagram of an electronic protective circuit whose extinguishing circuit and deexcitation circuit possess a common current path and whose extinguishing thyristor is simultaneously used as the controlled valve for the deenergization or deexcitation circuit.

FIG. 2 illustrates the principle circuit diagram of a two-phase bridge circuit 30 containing a related protective circuit 31, whose extinguishing thyristor 32 simultaneously is effective as the controlled valve for the deexcitation circuit. With this circuit the two-phase secondary winding 33 of the transformer is connected in known manner with both of the branches 34, 36 of a rectifier bridge. At the outputs of the bridge circuit 30 there is again connected an inductive load 37. The one terminal 38a of the extinguishing capacitor 38 is connected by means of an extinguishing choke or coil 39 and two decoupling diodes 41 with each of the two input lines of the bridge circuit 30. The other terminal 38b of the extinguishing capacitor is connected by means of the thyristor 32 with the one output line or conductor 42 and by means of a diode 43 and a deenergization resistance or resistor 44 with the other output line 46 of the bridge circuit 30.

Upon igniting or firing the extinguishing and deenergizing thyristor 32 and at the same time blocking the firing pulses for the not particularly referenced thyristors in the bridge rectifier 30 the extinguishing capacitor 38 is discharged or reversed in charge, as the case may be, by means of the line 42, the load 37, the line 46, the thyristor in the bridge branch 36 which at this time is current-conductive, the subsequently connected decoupling diode and the extinguishing inductance 39. Consequently, the current through the conductive thyristor in the bridge branch 34 is interrupted with the appearance of the capacitor discharge current, whereas the current in the conductive thyristor of the bridge branch 36 first is interrupted with the capacitor voltage has dropped to the forward voltage of this thyristor and the subsequently connected decoupling diode.

For a three-phase circuit, constructed according to FIG. 2, it could be demonstrated that the load current is carried by the extinguishing circuit 180 microseconds after the firing of the extinguishing thyristor and the thyristors in the bridge branch 34 were without current and after 1825 microseconds also the current flow through the thyristors in the bridge branch 36 was interrupted. The deexcitation or deenergization current of 15 kA requires approximately 10 seconds, in order to decay by means of the deenergization circuit.

The diode 43 in the deexcitation circuit prevents that the deexcitation circuit forms for the capacitor discharge current a shunt to the extinguishing circuit, which delays or prevents commutation of the load current from the bridge branch 34 to the capacitor 38.

Figure 3:
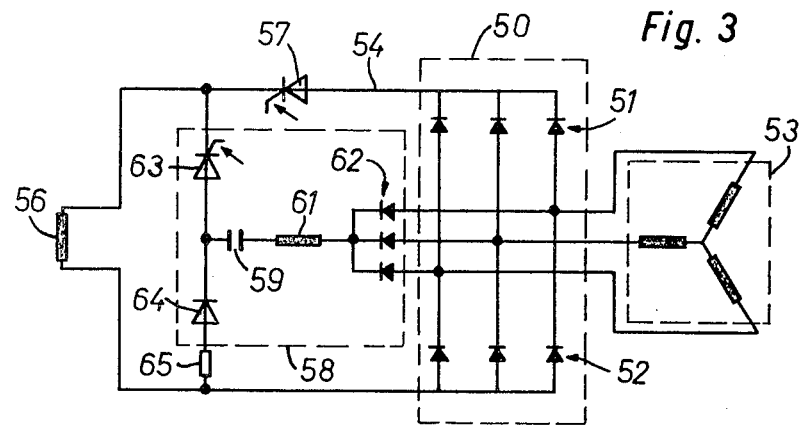
FIG. 3 illustrates a principle circuit diagram of an electronic protective circuit containing a switching thyristor which is arranged in the one output line of a non-controlled bridge rectifier.

FIG. 3 illustrates a schematic circuit diagram of a three-phase diode rectifier bridge 50 provided with a protective circuit. The rectifier bridge 50 contains in both bridge branches 51, 52 respectively three diodes which are connected with the armature winding 53 of a three-phase machine, the armature winding being connected in star. In the connection line 54 leading from one bridge branch 51 to the load 56 there is provided a switching thyristor 57. The extinguishing and deexcitation circuit 58 is constructed practically the same as for the embodiment of FIG. 2 and contains an extinguishing capacitor 59, an extinguishing choke or coil 61, three decoupling diodes 62 connected with the lines of the winding 53 and in series circuit an extinguishing and deexcitation thyristor 63, a diode 64 and a deexcitation resistance or resistor 65.

The function of this protective circuit corresponds practically exactly to that already described with respect to the operation of the protective circuit of FIG. 2. What is different however is only that the load current from the bridge branch 51, following the commutation to the capacitor 59, is interrupted by the blocking of the additional switching thyristor 57, because the diodes in the bridge are not continuously blocked.

The circuit of FIG. 3 can be used, for instance, for the indirect rotating excitation of a synchronous generator where the revolving armature winding 53 coacts with a stationary excitation winding and the load 56 constructed as a revolving excitation winding coacts with a generator winding which is connected in star-configuration. It should be understood that for this application there are required photo-fired thyristors, something which has been symbolically indicated by the arrows.

Figure 4:
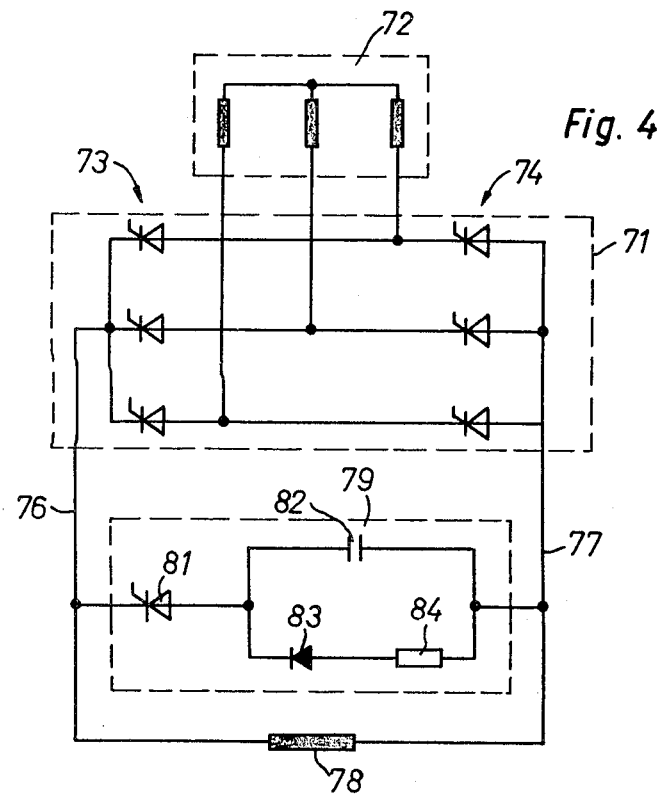
FIG. 4 is a principle circuit diagram of an electronic protective circuit whose extinguishing circuit and deexcitation circuit possess a common current path, and the extinguishing circuit is connected parallel to a controlled bridge rectifier.

FIG. 4 illustrates a principle circuit diagram of a three-phase bridge rectifier 71 whose extinguishing circuit and deenergization or deexcitation circuit has a common branch containing a thyristor 81 effective for both circuits and wherein the extinguishing circuit is connected parallel to both bridge branches. The illustrated bridge rectifier 71 is again connected with the secondary winding 72 of a transformer, and the outputs of both bridge branches 73, 74 are connected by means of the lines or conductors 76, 77 with the inductive load 78. The protective circuit 79 contains an extinguishing and deenergization thyristor 81, with which there is connected in series an extinguishing capacitor 82. Furthermore there is connected in parallel with the extinguishing capacitor 82 a diode 83 and a deexcitation or deenergization resistance 84.

During firing of the extinguishing and deexcitation thyristor 81 the extinguishing capacitor 82 discharges by means of the line 76, the load 78, the line 77, the thyristor in the bridge branch 74 which is conductive at this point in time, two winding branches of the secondary winding 72 and the still conductive thyristor in the bridge branch 73. This arrangement of the extinguishing circuit has the advantage that there are not required any additional extinguishing inductances, because the secondary winding 72 of the transformer which is incorporated into the extinguishing current circuit assumes the function of the extinguishing choke and the load current in both bridge branches practically simultaneously is interrupted.

FIG. 5 illustrates the principle schematic circuit diagram of a circuit current containing anti-parallel circuits equipped with the novel protective circuit. This circuit contains a three-phase rectifier bridge 90, the inputs of which are connected with the secondary winding 91 of a transformer, as well as a three-phase rectifier inverter bridge 92, whose inputs are connected with the outputs of the secondary winding 93 of a transformer. Both of the branches 94, 96 of the bridge rectifier 90 are connected by means of the lines 97, 97' and 98, 98' with the oppositely polarized branches 99 and 101, respectively, of the rectifier inverter bridge 92. In the one line 98, 98' there is provided a circular current choke 102, and the inductive load 103 is connected between the lines 97, 97' and 98, 98'. The circuit contains an extinguishing circuit 104 composed of the series circuit of an extinguishing thyristor 106, an extinguishing capacitor 107 and an extinguishing choke or coil 108. The free end or terminal 108a of the extinguishing choke 108 is connected by means of the decoupling diodes 109 with the input lines for the rectifier bridge 90 and the free end or terminal 106a of the extinguishing thyristor 106 is connected by means of decoupling diodes 111 with the output lines for the rectifier inverter bridge 92. Between the connection point of the d.c to a.c-side decoupling diodes 111 and the one output line 97' of the rectifier inverter there is provided an extinguishing resistance 119. Connected in parallel to the load 103 and to the output lines 97, 98 of the rectifier bridge 90 is a first deexcitation circuit 112, and likewise connected in parallel to the load 103 and to the output lines 97', 98' of the rectifier inverter bridge 92 is a second deexcitation circuit 113. Each deexcitation circuit 112 and 113 contains a thyristor 114 and 116, respectively, and a deexcitation resistance or resistor 117 and 118, respectively.

As far as the description of the mode of operation of the extinguishing circuit in this circuit arrangement is concerned it is assumed that in the rectifier bridge 90 the thyristors 121 and 122 are fired or ignited and in the rectifier inverter bridge 92 there are ignited the thyristors 123 and 124. In such case in the showing of FIG. 5 current flows from the right branch of the figure of the transformer winding 91 through the thyristor 121, the line 97 to the load 103 and through the line 98 and the thyristor 122 to the center branch of the same transformer winding. At the same time in such FIG. 5 there flows a current from the right branch of the transformer winding 93 through the thyristor 123, the line 98' and the circular current choke 102, the line 98, the thyristor 122, the tranformer winding 91 and the thyristor 121, the lines 97, 97' and the thyristor 124 back to the center branch of the transformer winding 93.

When firing the extinguishing thyristor 106 the extinguishing capacitor 107 is discharged by means of the rectifier branch and the inverter branch of this circuit. The rectifier discharge circuit extends across the extinguishing resistor 119, the line 97', the load 103, the line 98, the thyristor 122 assumed to be conductive, the related decoupling diode and the extinguishing inductance 108. Upon occurrence of the discharge current in the line 97' the current in the line 97 is interrupted, so that upon absence of the firing pulse the thyristor 121 is extinguished. The discharge current circuit through the inverter extends across the decoupling diodes 111, the thyristor 123 assumed to be conductive, the line 98', the circular current choke 102, the line 98, the thyristor 122 assumed to be conductive, the subsequently connected decoupling diode and the extinguishing inductance 108. The current appearing in the infeed line to the thyristor 124 and flowing through the center and right branch of the secondary winding 93 shown in the drawing of FIG. 5 ensures that the thyristor 124 will be without current during a sufficiently long period of time in order that such thyristor extinguishes.

Because at the same time as the extinguishing thyristor 106 is fired also the thyristors 114, 116 in the deexcitation circuits are fired, it is possible for the deexcitation current to decay as a function of its direction by means of the one or the other deexcitation circuit.

As has already been heretofore explained, the novel protective circuit can be beneficially and advantageously employed in excitation systems for synchronous machines which are provided for energy generation or distribution purposes. The largest generators used at the present time have an excitation voltage of about 1000 volts at a rated current up to about 10000 amperes. Upon the presence of faults in the armature circuit, for instance a stator winding short circuit or a high-voltage fault there can be induced in the field winding and the excitation circuit which is operatively associated therewith fault or short-circuit currents which can amount to a multiple of the mentioned rated current. Since in the presence of a fault in the armature circuit the generator voltage practically drops to zero, and thus, there is not present the commutation voltage for the thyristors in the rectifier arrangement and the time needed for opening a mechanical disconnector switch and commutation of the current to the deexcitation circuit amounts to about 100 to 200 milliseconds, the last fired thyristors, during this time span, will carry the total fault current and additionally upon opening of the disconnector switch will be loaded with the excessive arc voltage which thus is formed. In the absence of suitable protective devices, in such case at least the thyristors in the rectifier arrangement will have flowing there-through high fault currents or the excessive arc voltage and therefore in all liklihood will become damaged.

Due to the exceptionally rapid relief of the current rectifier valves from the action of the fault or short-circuit current there can be prevented a response of the fuses which are connected in series with such valves. The described protective circuit can of course also be employed for turning-off and deenergizing active load circuits, for instance the armature circuit of a direct-current machine having back-off voltage.

While there are shown and described present preferred embodiments of the invention, it is to be distinctly understood that the invention is not limited thereto, but may be otherwise variously embodied and practiced within the scope of the following claims. Accordingly,

What I claim is:

1. An electronic protective circuit for interrupting the current flowing from an alternating-current supply through a rectifier circuit equipped with controlled valves to an inductive load and for deenergizing said inductive load, comprising:
   an extinguishing circuit;
   at least one switching thyristor arranged between the alternating-current supply and the inductive load with which there is connected in parallel the extinguishing circuit;
   said extinguishing circuit containing an extinguishing thyristor and a capacitor connected in series with the extinguishing thyristor; and
   a deenergization circuit connected to terminals of the inductive load and comprising a resistor and controlled valve connected in series, wherein said deenergization circuit and said extinguishing circuit contain a common current path, in which the extinguishing thyristor is simultaneously used as said controlled valve for the deenergization circuit and wherein the remaining circuit of the deenergization circuit contains a diode which is poled in series with the extinguishing thyristor.

2. The electronic protective circuit as defined in claim 1, further including;
   decoupling diodes for connecting the extinguishing circuit with supply voltage lines for the rectifier circuit.

3. The electronic protective circuit as defined in claim 1, wherein:
   said capacitor of said extinguishing circuit is connected in parallel with said diode and said resistor in said deenergization circuit.

4. An electronic protective circuit for interrupting the current flowing from a first alternating-current supply through a rectifier bridge equipped with controlled valves in the branches of the bridge and from a second alternating-current supply through a rectifier inverter bridge equipped with controlled valves in the branches of the bridge to an inductive load, and for deenergizng said inductive load, comprising:
   an extinguishing circuit;
   at least one first switching thyristor arranged in the rectifier bridge and at least one second switching thyristor arranged in the rectifier inverter bridge with which there is connected in parallel the extinguishing circuit;
   said extinguishing circuit containing an extinguishing thyristor and a capacitor connected in series with the extinguishing thyristor; and
   a first deenergization circuit connected in prallel with said inductive load and connected in parallel with said branches of said rectifier bridge and a second deenergization circuit connected in parallel with said branches of said rectifier inverter bridge, wherein each of said two deenergization circuits contains a resistor and a controlled valve connected in series and coupled by a current limiting choke.

5. The electronic protective circuit as defined in claim 4, further including;
   decoupling diodes for connecting the extinguishing circuit with supply voltage line for the rectifier circuit.

* * * * *